(12) United States Patent
Simen et al.

(10) Patent No.: US 9,264,504 B2
(45) Date of Patent: *Feb. 16, 2016

(54) SYSTEM AND METHOD FOR PROVIDING ACCESS TO PRESENCE STATUS FOR MOBILE DEVICES

(75) Inventors: Silviu Florian Simen, Mississauga (CA); Leif Edvard Bildoy, Isleworth (GB); Tao Cui, San Jose, CA (US); Donald Scott Clayton, Toronto (CA); Alina Kushnir, Vaughan (CA); Wayne David Rantala, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,688

(22) Filed: Apr. 4, 2012

(65) Prior Publication Data
US 2013/0227119 A1     Aug. 29, 2013

Related U.S. Application Data

(63) Continuation-in-part of application No. 13/408,891, filed on Feb. 29, 2012.

(51) Int. Cl.
*G06F 15/173* (2006.01)
*H04L 29/08* (2006.01)

(52) U.S. Cl.
CPC ..................................... *H04L 67/24* (2013.01)

(58) Field of Classification Search
CPC ...... H04L 67/24; H04L 51/043; H04W 4/003
USPC .................................. 709/224; 340/1.1–16.1
See application file for complete search history.

(56) References Cited

U.S. PATENT DOCUMENTS

| 7,493,390 | B2 | 2/2009 | Bobde et al. | |
| 7,545,762 | B1 | 6/2009 | McConnell et al. | |
| 2002/0083127 | A1* | 6/2002 | Agrawal | H04L 12/581 709/203 |
| 2003/0073440 | A1* | 4/2003 | Mukherjee | H04L 12/58 455/435.1 |
| 2003/0217099 | A1 | 11/2003 | Bobde et al. | |
| 2006/0149814 | A1 | 7/2006 | Borella | |

(Continued)

OTHER PUBLICATIONS

Debbabi et al. (NPL: The war of Presence and Instant Messaging: Right Protocols and APIs, Panasonic Information and Networking Technologies Laboratory, pp. 341-346, Jan. 2004.*

(Continued)

*Primary Examiner* — Farid Homayounmehr
*Assistant Examiner* — Lizbeth Torres-Diaz
(74) *Attorney, Agent, or Firm* — Jon Gibbons; Fleit Gibbons Gutman Bongini & Bianco P.L.

(57) ABSTRACT

A system and method are provided for enabling access to presence status for mobile devices. The method comprises receiving, via an application programming interface, a subscription request, the subscription request requesting a presence data for at least one mobile device; registering a subscription for a subscriber device according to the subscription request; obtaining network data from one or more network infrastructure nodes associated with providing service to the at least one mobile device; determining that at least a portion of the network data is associated with the subscription; and providing the at least a portion of the network data to the subscriber device via the application programming interface.

27 Claims, 13 Drawing Sheets

(56) References Cited

U.S. PATENT DOCUMENTS

| | | |
|---|---|---|
| 2008/0249997 A1 | 10/2008 | Sun et al. |
| 2009/0070410 A1 | 3/2009 | Gilfix et al. |
| 2009/0275314 A1* | 11/2009 | Cotevino ............ H04L 12/5815 455/414.2 |
| 2010/0094993 A1 | 4/2010 | Rogers et al. |
| 2011/0032896 A1* | 2/2011 | Cubic .................... H04L 12/24 370/329 |
| 2011/0066688 A1 | 3/2011 | Pinding |
| 2011/0153782 A1 | 6/2011 | Zhao |
| 2011/0199962 A1* | 8/2011 | Kahn ................. H04L 12/5692 370/328 |
| 2011/0202641 A1* | 8/2011 | Kahn .................... H04L 67/322 709/221 |
| 2011/0280196 A1 | 11/2011 | Maggenti et al. |
| 2011/0314482 A1* | 12/2011 | Cupala .............. G06F 17/30899 719/328 |

OTHER PUBLICATIONS

Extended European Search report mailed Apr. 9, 2013, in corresponding European patent application No. 13154956.0.
Non-Final Office Action mailed Jul. 23, 2013, in corresponding U.S. Appl. No. 13/408,891.
Non-Final Office Action mailed Oct. 2, 2014; in U.S. Appl. No. 13/408,891.

* cited by examiner

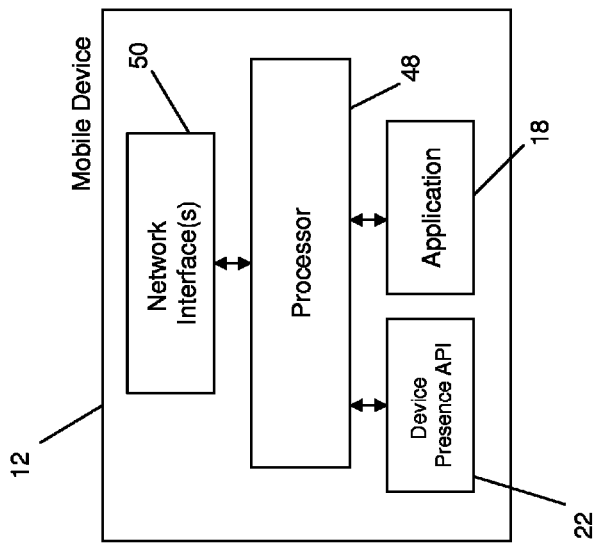
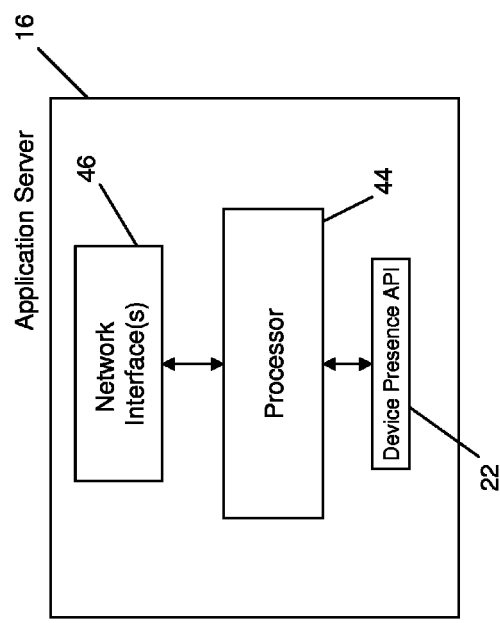

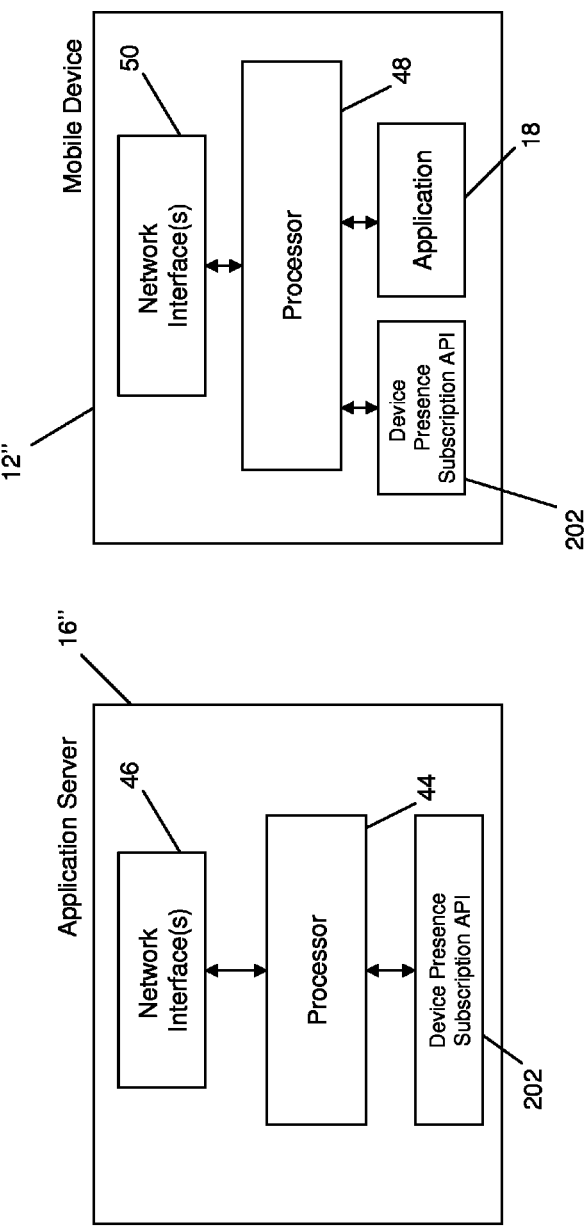

US 9,264,504 B2

SYSTEM AND METHOD FOR PROVIDING ACCESS TO PRESENCE STATUS FOR MOBILE DEVICES

This application is a continuation-in-part of U.S. patent application Ser. No. 13/408,891 filed on Feb. 29, 2012, the contents of which are incorporated herein by reference.

TECHNICAL FIELD

The following relates to systems and methods for providing access to presence status for mobile devices.

DESCRIPTION OF THE RELATED ART

Applications developed for mobile devices may depend on, or otherwise utilize, device presence information about particular devices. For example, a server may also wish to send data to a mobile device based on presence information, for example, only when that mobile device is in coverage. A mobile device may also wish to know the coverage status of another device. Currently, client side applications may be relied upon to report device presence information to a server associated with the particular client application. However, relying on the client application to determine device presence information and provide this information to the server can be inefficient and/or require complex low-level programming on the part of the application developer.

BRIEF DESCRIPTION OF THE DRAWINGS

Embodiments will now be described by way of example only with reference to the appended drawings wherein:

FIG. 5 is a block diagram of an example of a configuration for an application server;

FIG. 6 is a block diagram of an example of a configuration for a mobile device;

FIG. 13 is a block diagram of an example of a configuration for an application server as a subscriber;

FIG. 14 is a block diagram of an example of a configuration for a mobile device as a subscriber.

DETAILED DESCRIPTION

Figure 1:
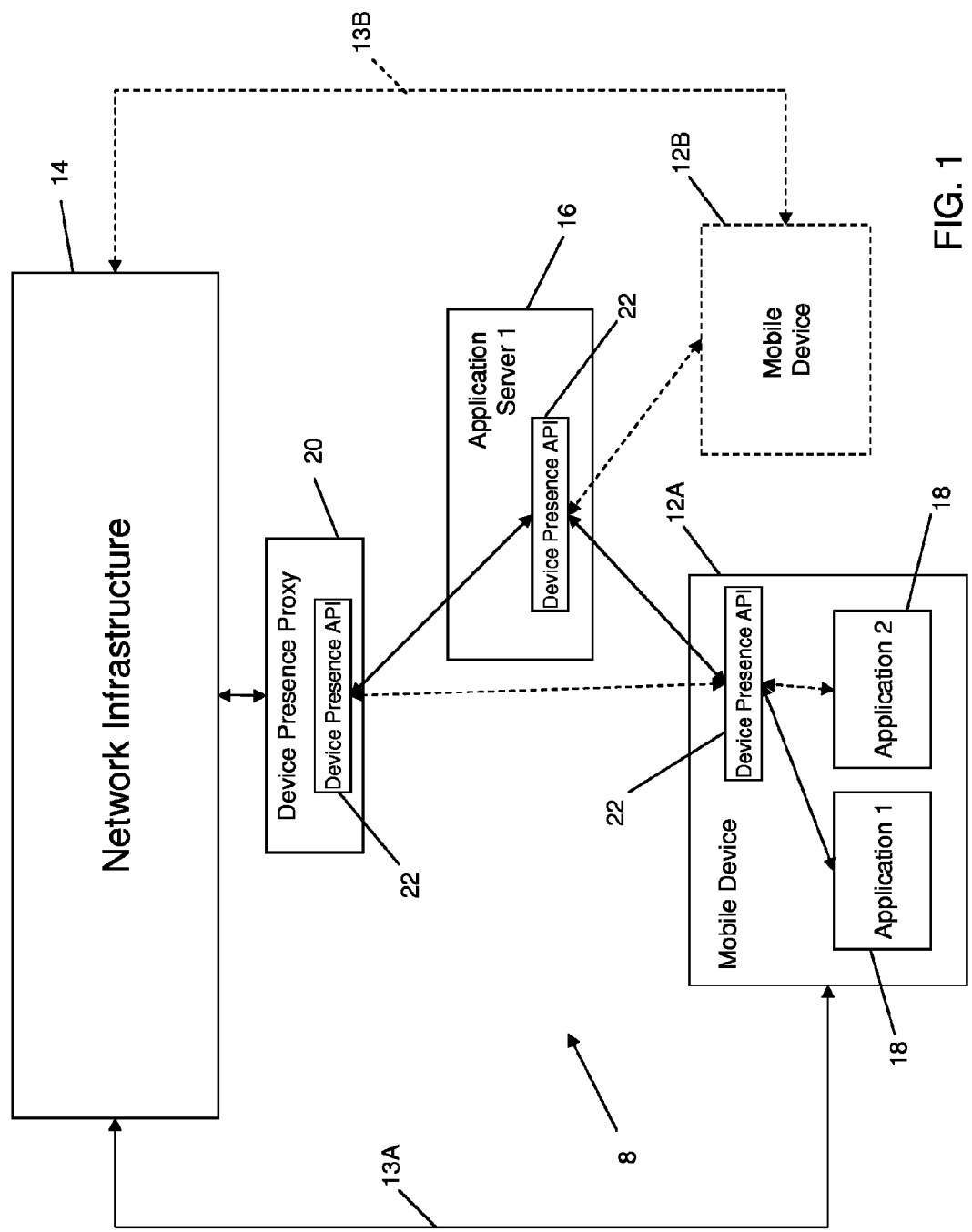
FIG. 1 is a schematic diagram of a communication system having a network infrastructure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been found that allowing application developers to use network- or cloud-based resources and application programming interfaces (APIs) enables rapid deployment of applications. By providing an API front-end in an application development platform that exposes data from a proxy or other entity having access to data in a network infrastructure, applications and application servers can query and receive device presence information for a particular device, the presence information being mined from the network infrastructure. The API exposes information available to the device presence proxy, deployed in, or otherwise in communication with, the network infrastructure, to enable the applications and application servers to obtain device presence information mined from the network infrastructure.

It has also been recognized that the presence information mined from the network can also be used in a publisher/subscription delivery model to allow an asynchronous delivery of presence information for one or more particular devices, to a subscriber, according to a subscription with an entity having access to the presence information.

The device presence proxy, the application server, or both the device presence proxy and application server may be hosted by a cloud-based platform to enable applications and application servers to be developed using the cloud-based platform with such application servers hosted in the cloud. In this way, rapid application development can be supported by reducing the low-level programming required to obtain network presence information concerning one or more mobile devices.

The device presence information mined from the network infrastructure may include coverage status, roaming status, transport type, date of a previous transport change, time of a previous transport change, last authentication result for the mobile device, last time of authentication, etc.

Referring now to FIG. 1, an example of a communication system 8 is shown, in which a mobile device (e.g., 12A and 12B, each of which may be referred to generically in this disclosure as mobile device 12) can communicate with or otherwise access a network infrastructure 14 for utilizing one or more network services (e.g., 13A and 13B, each of which may be referred to generically in this disclosure as network service(s) 13), e.g., messaging, telephony, web access, etc. The mobile device 12A includes an application 18 that may operate with an associated application server 16. The application server 16 may be hosted by any suitable network- or cloud-based system, or may be custom built and hosted by a particular entity. In the example shown in FIG. 1, Application Server 1 is associated with a client application, such as Application 1. Application Server 1 may be communicable with client applications installed on more than one mobile device, e.g., Mobile Device 12A and Mobile Device 12B. For example, the application server 16 may be associated with copies of the application 18 on multiple mobile devices 12A, 12B. As will be described, in one embodiment of the present disclosure Application Server 1 may utilize a single query to the device presence proxy 20 to obtain device presence information for a plurality of mobile devices. Also shown in FIG. 1 is an Application 2, which does not have a corresponding application server 16. The application server 16 is operable to communicate with a device presence proxy 20 by having access to a device presence API 22. The device presence proxy 20 is included in or otherwise in communication with the network infrastructure 14 for obtaining device presence information and exposing that device presence information via the device presence API 22 made available to the application server 16. In some implementations, the mobile device 12A may also include a device presence API 22 for communicating with the application server 16 in obtaining device presence information exposed by the device presence proxy 20.

As noted above, some applications 18 may not have a corresponding application server 16 and thus the device presence API 22 may also provide programming instructions to enable particular applications 18 (e.g., Application 2) to communicate directly with the device presence API 22 in the device presence proxy 20 in order to obtain network data exposed by the device presence proxy 20 directly as illustrated in dashed lines in FIG. 1. It can be appreciated that the device presence API 22 is shown using a common reference numeral for the sake of illustration and that this API may differ depending on which device contains it. For example, instructions included in the device presence API 22 on the mobile device 12 may differ from those included in an application server 16.

The configuration shown in FIG. 1 enables applications 18 and application servers 16 to determine a device's network-related presence without having to query the mobile device 12 or rely on reports from the mobile device 12. Exposing data provided by the network infrastructure 14 can minimize the low-level programming required by the application developer to obtain presence information for a particular mobile device 12 that is required or otherwise utilized by an application client 18 and/or application server 16. Moreover, applications 18 deployed on the mobile device 12 do not need to have knowledge of the particular device type, OS version or memory location in order to determine network-based device presence since the device presence API 22 provides a network- or cloud-based source for such information.

The device presence proxy 20 may be hosted on or otherwise provided by a server apparatus or network component having a processor or processing capabilities. Although the device presence proxy 20 shown in FIG. 1 is part of the network infrastructure 14, it can be appreciated that the device presence proxy 20 may instead be independent of and communicable with the network infrastructure 14.

The device presence proxy 20 has access to, for example, network infrastructure nodes in the network infrastructure 14 that can determine various device presence status types based on interactions between the mobile device 12 and the network infrastructure 14, e.g., where the network infrastructure nodes are associated with providing network services 13 to the mobile device 12. The device presence information mined from the network infrastructure 14 may include coverage status, roaming status, transport type, date of a previous transport change, time of a previous transport change, last authentication result for the mobile device, last time of authentication, etc.

Figure 2:
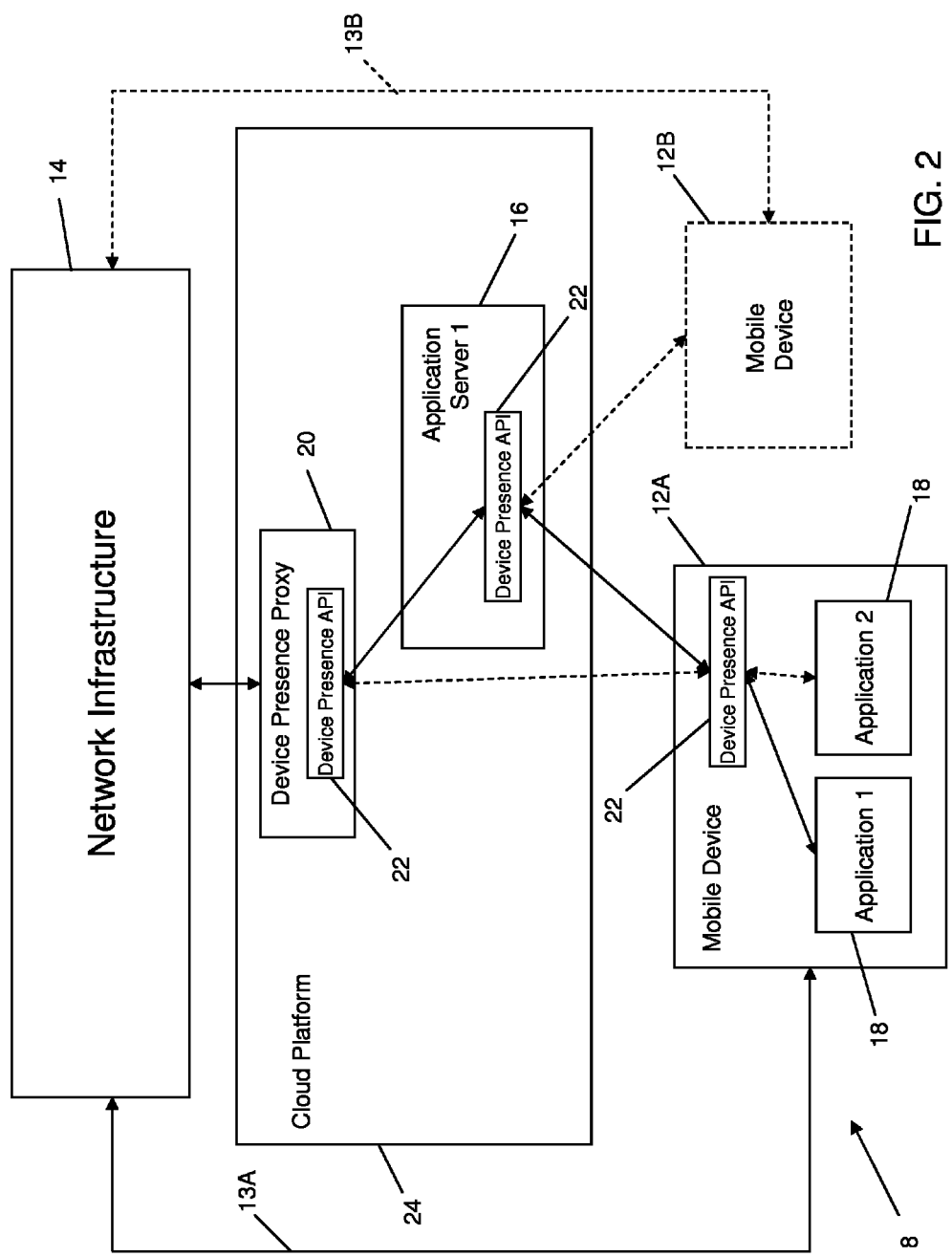
FIG. 2 is a schematic diagram of a communication system having a network infrastructure.

As illustrated in FIG. 2, the device presence proxy 20 and the application server 16 may be hosted or otherwise provided by a cloud-based application development platform (cloud platform 24 hereinafter). The cloud platform 24 provides a central resource for applications that are deployed on to mobile devices 12. For example, the cloud platform 24 may be accessed by a developer to obtain a programming toolkit for developing an application 18 that can be deployed to various mobile device 12, and for hosting an application server 16 corresponding to the application 18.

Figure 3:
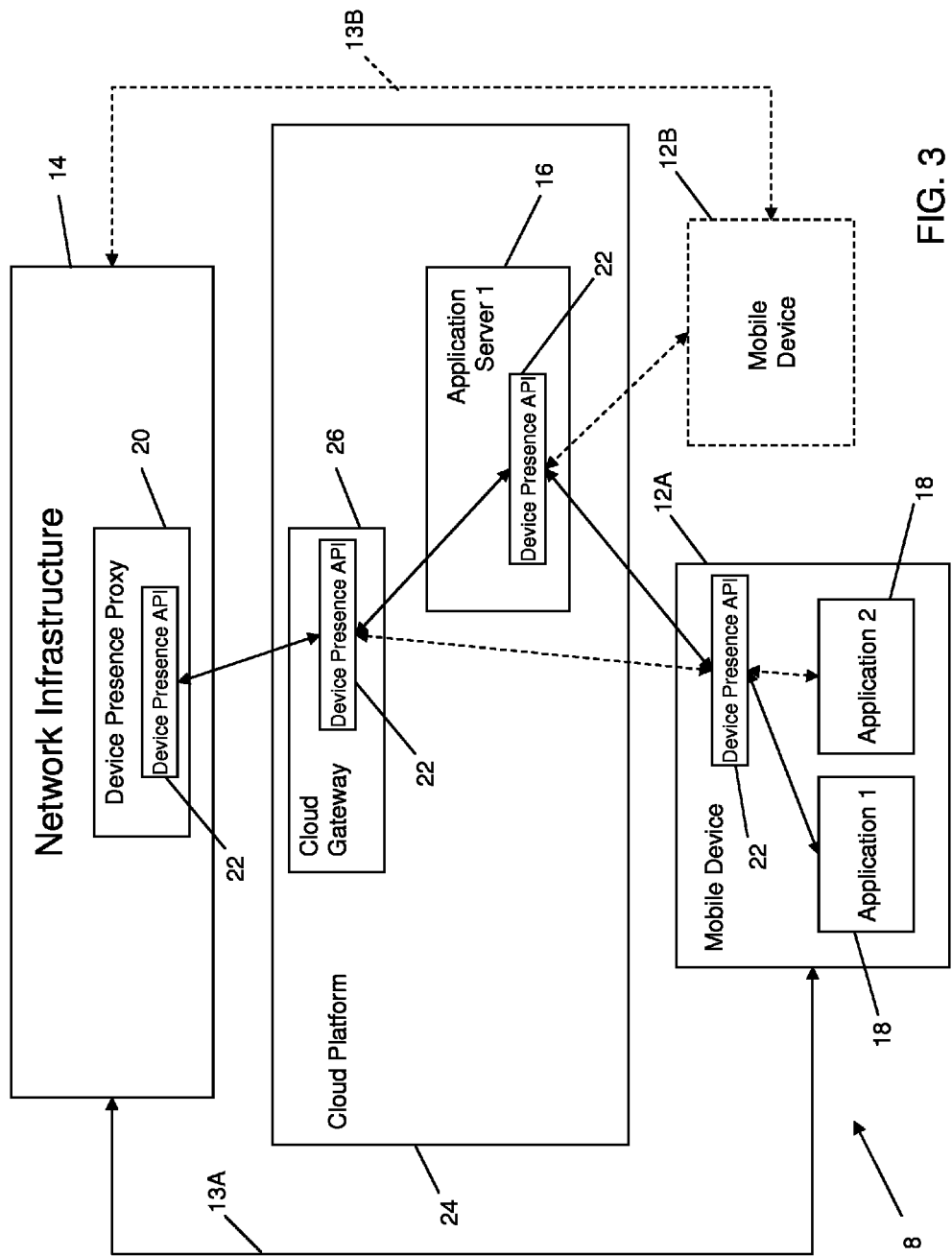
FIG. 3 is a schematic diagram of a communication system having a network infrastructure.

It can be appreciated that the cloud platform 24 may be part of a wider cloud-based environment that provides other services. For example, as shown in FIG. 3, the cloud platform 24 may include a cloud gateway 26 that provides an access point for interfacing with the network infrastructure 14. As discussed below, the cloud gateway 26 may be used to query domains within the network infrastructure 14 that are different from those relied upon for mining device presence information. For example, the cloud gateway 26 may also be used to obtain device billing information by accessing a provisioning server. In the configuration shown in FIG. 3, the cloud gateway 26 includes the device presence API 22 for communicating with the device presence proxy 20 which, in FIG. 3 is in the network infrastructure 14. The cloud gateway 26 may be responsible for managing queries to the network infrastructure 14 and thus may be used to authenticate and authorize requests, perform throttling and filtering, and to route requests to appropriate data providers (e.g., to specific domains and/or nodes within the network infrastructure 14). The cloud gateway 26 may therefore be an existing cloud platform component that is provided the device presence API 22 in order to enable device presence requests to be authorized and routed to the device presence proxy 20, among other requests.

It can be appreciated that depending on the role of the cloud gateway 26, the device presence API 22 provided to the cloud gateway 26 may differ from the device presence API 22 made available to the mobile devices 12 and application servers 16. For example, the mobile devices 12 and application servers 16 may have an API that includes program instructions for communicating with the cloud gateway 26 rather than directly with the device presence proxy 20 in a "two-tiered" configuration. For the purpose of illustration, the device presence API 22 will be considered any API that provides the ability to obtain device presence information, whether directly from the device presence proxy 20 (e.g., as shown in FIGS. 1 and 2), or via another agent or service or entity such as the cloud gateway 26 shown in FIG. 3.

Figure 4:
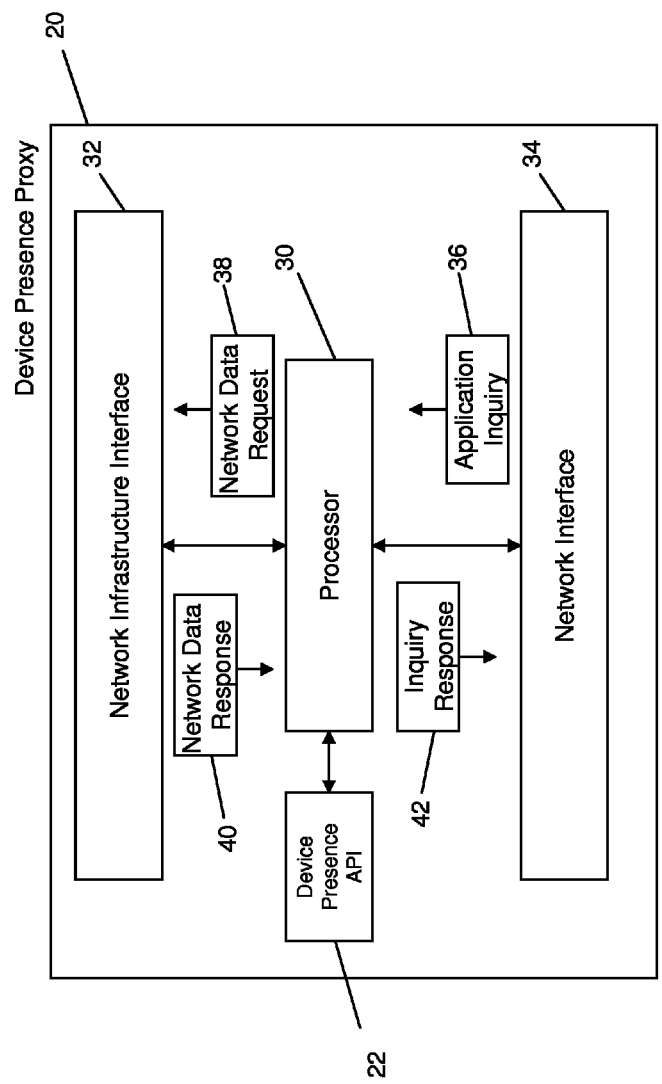
FIG. 4 is a block diagram of an example of a configuration for a device presence proxy.

FIG. 4 illustrates an example of a configuration for the device presence proxy 20. The device presence proxy 20 includes a processor 30 for processing application inquiries 36 from applications 18 and/or application servers 16 requesting presence data for at least one mobile device 12; and for obtaining network data from, for example, network infrastructure nodes associated with network services 13 provided to the mobile device 12, in order to respond to the application inquires 36. The application inquiries 36 and inquiry responses 42 may be formatted according to message syntax associated with the device presence API 22. The device presence proxy 20 includes a network infrastructure interface 32 for communicating with the network infrastructure 14 in order to, for example, participate in a request-response exchange with one or more network infrastructure nodes. It can be appreciated that the network infrastructure interface 32 generally represents any software, hardware, or combination thereof, used or required to connect and communicate with the network infrastructure 14. The device presence proxy 20 also includes a network interface 34 for communicating via one or more networks within the communication system 8 (e.g., via the Internet, a cellular network, etc.). The device presence proxy 20 may also communicate with one or more of the cloud gateway 26 (FIG. 3) in the cloud platform 24, application servers 16 (FIGS. 1-3), and mobile devices 12 (FIGS. 1-3). The device presence API 22 provided to the cloud gateway 26 and/or application servers 16 and/or mobile devices 12, enables the application 18 and/or application server 16 to obtain data exposed by the network infrastructure 14. It can be appreciated that the network interface 34 generally represents any software, hardware, or combination thereof, used or required to connect and communicate with the cloud gateway 26, application server 16 and mobile device 12.

The processor 30 receives an application inquiry 36 from the cloud gateway 26, mobile device 12, or application server 16 via the network interface 34, the application inquiry 36 requesting a presence data for at least one mobile device 12. Based on the application inquiry 36, the processor 30 sends a network data request 38 to the network infrastructure 14 via the network infrastructure interface 32, to obtain network data from one or more network infrastructure nodes associated with providing service to the at least one mobile device 12. The processor 30 receives or otherwise obtains a network data response 40 from the network infrastructure 14, which includes the requested network data. The processor 30 then uses the obtained network data to determine an application inquiry response 42 to the application inquiry 36 and sends the inquiry response 42 to the requestor, e.g., the cloud gateway 26, mobile device 12, or application server 16, depending on from where the application inquiry 36 originated, via the network interface 34.

FIG. 5 illustrates an example of a configuration for the application server 16. It can be appreciated that various components of the application server 16 are omitted for brevity. The application server 16 includes one or more network interfaces 46 for communicating with one or more mobile devices 12 and for communicating with the cloud gateway 26 or device presence proxy 20 using the device presence API 22. The application server 16 also includes a processor 44 for handling requests from mobile devices 12, providing responses to the mobile devices 12, and for exchange request and responses with the cloud gateway 26 or device presence proxy 20, among other things.

The mobile device 12 also includes one or more network interfaces 50 for accessing and utilizing the network services 13 and for enabling the application 18 to communicate with the application server 16, device presence proxy 20 and/or cloud gateway 26. The mobile device 12 also includes a processor 48 for executing program instructions, e.g., for utilizing the device presence API 22, enabling the application 18 to be used, etc.

Figure 7:
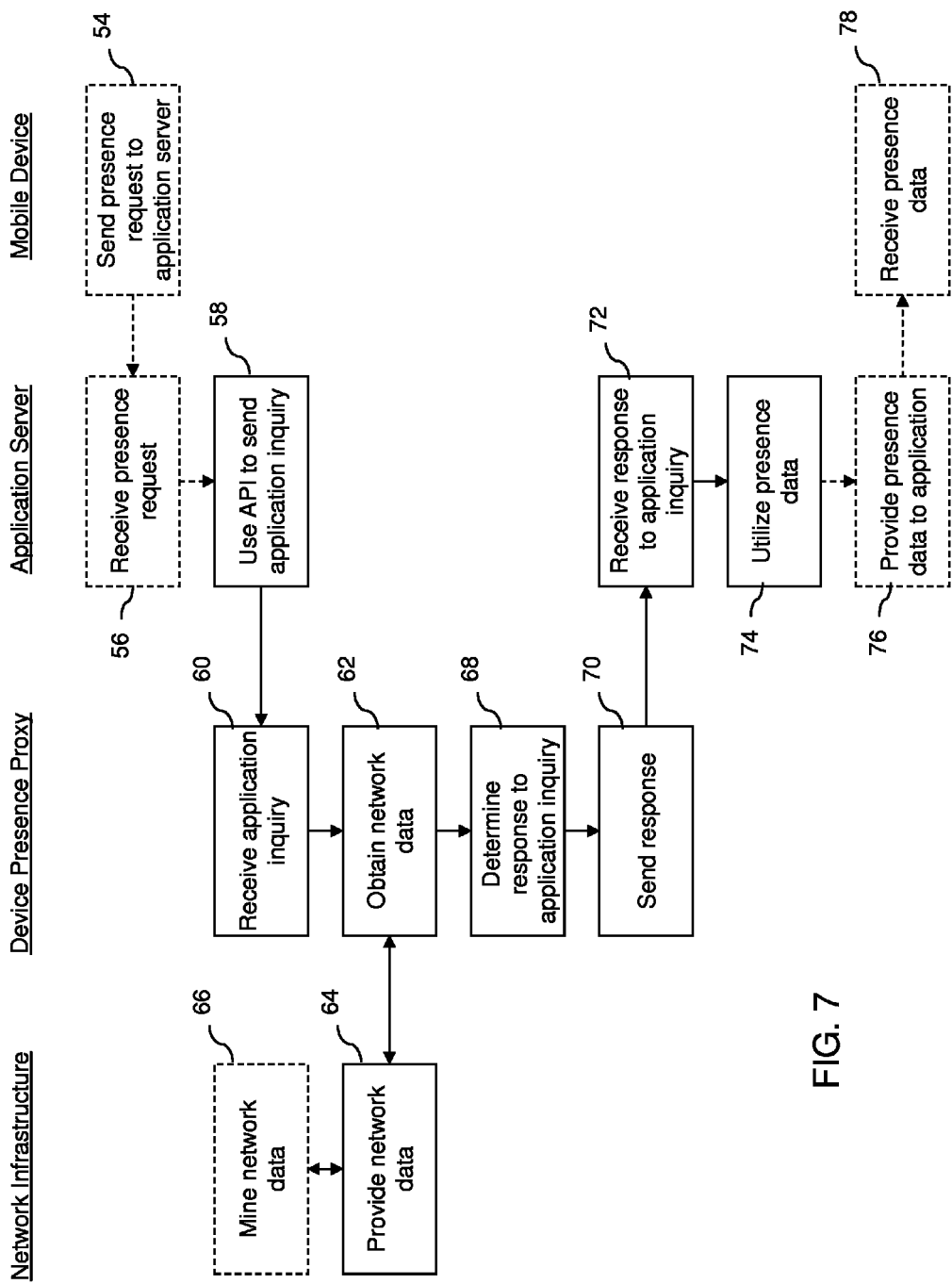
FIG. 7 is a flow chart illustrating an example of a set of computer executable operations that may be performed in obtaining device presence information determined from a network infrastructure.

FIG. 7 illustrates several operations that may be performed by various components in obtaining device presence information from exposed data from the network infrastructure 14. The operations described in FIG. 7 represent processes that may be performed by each of the Network Infrastructure, Device Presence Proxy, Application Server, and Mobile Device. While they are shown together in FIG. 7, it should be understood that the process illustrated within each of the four columns may be independently described and claimed for each device. Furthermore, the operations described with regard to FIG. 7 may be embodied at each device using a variety of alternatives, as described in this disclosure. In the example shown in FIG. 7, it is assumed that the device presence data is being requested by the application server 16. However, as shown in dashed lines in FIG. 7, it can be appreciated that the request for device presence data may also originate from the application 18 on the mobile device 12. It can also be appreciated that the presence data being requested by the application server 16 may relate to a plurality of mobile devices 12 and presence information requested by one mobile device 12 may relate to other mobile devices (not shown) running the application 18.

In the example shown in FIG. 7, the application server 16 uses the device presence API 22 to send an application inquiry 36 to the device presence proxy 20 at 58, either directly or via the cloud gateway 26. As noted above, the application inquiry 36 may originate at the application server 16, or may be facilitated by or forwarded on behalf of the mobile device 12. As shown in dashed lines, the application 18 on the mobile device 12 may send a presence request to the application server 16 at 54, which is received by the application server 16 at 56. It can also be appreciated that the presence request may also be sent by the mobile device 12 directly to the device presence proxy 20 in other examples.

The device presence proxy 20 receives the application inquiry 36 at 60 and obtains network data at 62 based on a request-response mechanism employed in communicating with one or more components or nodes within the network infrastructure 14. The network data is provided by the network infrastructure 14 at 64 and this data may be mined or otherwise found or determined by the network infrastructure 14 at 66 depending on the nature of the application inquiry 36, etc. For example, the device presence proxy 20 may determine a type of presence data from the application inquiry 36 and generate a network data request 38 that can be sent directly to a particular node in the network infrastructure 14. In other examples, more complicated request-response mechanisms may be employed in order to obtain the network data response 40 required to generate the application inquiry response 42. One such example is described below.

The device presence proxy 20 determines a response to the application inquiry 36 at 68 based on the nature of the data exposed by the network infrastructure 14 and sends an inquiry response 42 to the application server 16 directly or via the cloud gateway 26 at 70. The application server 16 receives the inquiry response 42 at 72 and utilizes the presence data at 74, e.g., to update a presence database or to perform a server-based operation such as updating a presence server (not shown). It can be appreciated that, as shown in dashed lines, the application server 16 may also provide presence data to the application 18 at 76, which is received by the mobile device 12 at 78.

Figure 8:
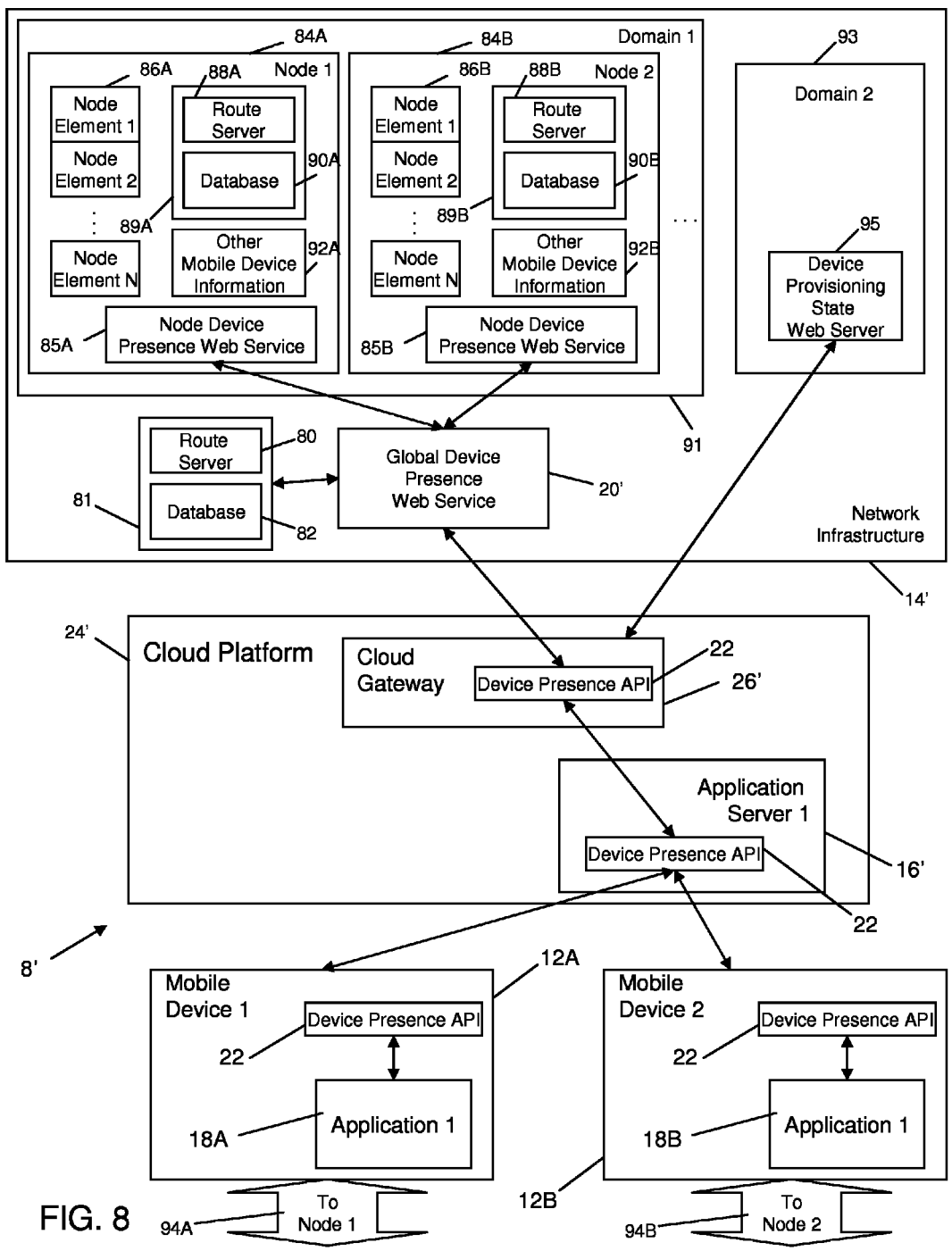
FIG. 8 is a schematic diagram of a communication system having a network infrastructure including multiple infrastructure nodes.

Referring now to FIG. 8, an example of a particular network infrastructure 14' is shown. In this example, an application 18A of a first mobile device 12A places a request for device presence information to an associated application server 16'. In another alternative (not shown), the application 18A may place the request for device presence information directly to the device presence proxy 20. The requested device presence information may pertain to the presence information of the first mobile device 12A, a second mobile device 12B, or any other mobile devices (not shown) having an application client 18. The application client 18A of the first mobile device 12A identifies the mobile device 12 (e.g. second mobile device 12B) for which the presence information is being requested by providing identifying information corresponding to that mobile device. For example, a personal identification number (PIN) associated with that mobile device 12 may be provided by the first mobile device 12A. The PIN may be a sequence of alphanumeric characters uniquely identifying a mobile device. The request for device presence data, which includes the supplied PIN, is received by the application server 16 and passed to the cloud gateway 26' for authorization and routing, using the device presence API 22 in the application server 16'. Assuming the request is authorized, the cloud gateway 26' routes the request to the device presence proxy 20, which in this example includes a global device presence web service 20' in the network infrastructure 14', and node device presence web services 85 in respective nodes 84 of a first domain (Domain 1) 91 in the network infrastructure 14', e.g., a relay domain. As shown in FIG. 8, the cloud gateway 26' may also be configured to route other requests or otherwise communicate with other domains within the network infrastructure 14', e.g., a second domain (Domain 2) 93 having a device provisioning state web server 95 for providing device billing information for a particular mobile device 12.

The global device presence web service 20' identifies, from a plurality of infrastructure nodes 84, the node containing presence information of the mobile device 12 for which the presence information is being requested. For example, the first mobile device 12A may receive network service(s) 94A provided by a first infrastructure node 84A. Hence, the global device presence web service 20' identifies the first infrastructure node 84A to retrieve presence information relevant to the first mobile device 12A. In another example, the application client 18A of the first mobile device 12A may want to determine presence information of the second mobile device 12B. The second mobile device 12B in this example receives network service(s) 94B provided by a second infrastructure node 84B. Hence, the global device presence web service 20' identifies the second infrastructure node 84B to retrieve presence information relevant to the second mobile device 12B.

To identify the infrastructure node 84 containing presence information relevant to the mobile device 12 for which the presence information is being requested, the global device presence web service 20' may access a route service 80 or a relay database 82 in a storage element 81. The route service 80 and the relay database 82 are complementary services which both provide PIN routing information that can used to match the supplied PIN to a corresponding node ID. The node ID identifies the infrastructure node 84 which can handle discovery of the relevant presence information. For example, the node ID may identify one of a plurality of infrastructure node elements 86 in the corresponding infrastructure node 84. Current routing information from the relay database 82 may also be included in the route service 80. If the route service 80 is not available, the relay database 82 can be used to look up the current node ID of the PIN.

FIG. 8 illustrates further detail of the first infrastructure node 84A and the second infrastructure node 84B. The first infrastructure node 84A includes one or more node elements 86A which handle requests for device presence information. The node elements 86A may include, among other things, a server or other network infrastructure element. The first infrastructure node 84A also includes a route service 88A and a relay database 90A in a storage element 89A, and various other mobile device information sources 92A, e.g., a wireless transport. The first infrastructure node 84A also includes a node device presence web service 85A for receiving and processing requests from the global device presence web service 20' It can be appreciated that the second infrastructure node 84B includes similar components identified using the suffix "B".

Once the node device presence web service 85 identifies the node element 86 to which the request will be sent, the node device presence web service 85 proxies the request to the identified node element 86. If the request to the node element 86 times out, the request is resubmitted to another node element 86 within the same infrastructure node 84. Upon receiving the request from the node device presence web service 85, the node element 86 may, for example, identify a wireless transport handling the mobile device 12, and query that wireless transport for the presence data. The node element 86 may alternatively mine data from the local route service 88 and the local relay database 90 to extract presence information.

The cloud gateway 26' shown in FIG. 8 may communicate with the global device presence web service 20' using a Simple Object Access Protocol (SOAP). The global device presence web service 20' may also communicate with the plurality of infrastructure nodes 84 using SOAP. The infrastructure node elements 86 may communicate with the local wireless transports through an Inter Relay Protocol (IRP) communication. Communication between the global device presence web service 20' and the route server 80 may be handled through IRP communications. The relay database 82 may be, for example, an SQL database. It should be understood that other common protocols may be used for communications between the global presence web service 20' and the cloud gateway 26', between the global presence web service 20' and the infrastructure node elements 86, or between the global presence web service 20' and the route server 80.

Figure 9:
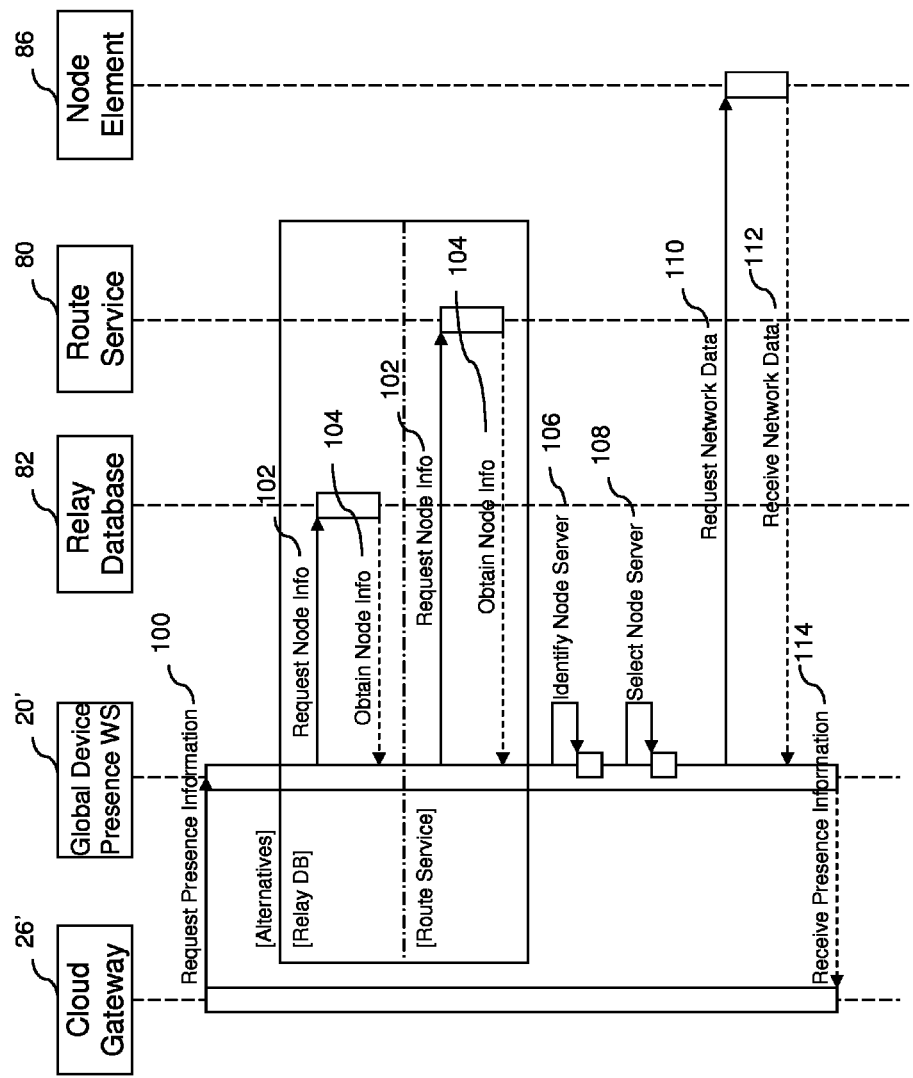
FIG. 9 is a sequence diagram illustrating operations performed in obtaining presence information.

Referring now to FIG. 9, a sequence diagram is provided illustrating a process by which the cloud gateway 26' may forward a request for presence information for a mobile device 12 on behalf of an application server 16. In the example shown in FIG. 9, the cloud gateway 26' places a request for presence information at 100 to the global device presence web service 20'. In the request made at 100, the cloud gateway 26' provides a PIN corresponding to the mobile device 12 for which the presence information is being requested. The global device presence web service 20' then places a request to the relay database 82 or route server 80 at 102, to determine PIN routing information. The PIN routing information is obtained by the global device presence web service 20' at 104. Based on the obtained routing information, the global device presence web service 20' identifies the node element 86 corresponding to the one or more identified node IDs at 106, and selects the node element 86 at 108. Once the appropriate node element 86 has been identified, the global device presence web service 20' may then send a request for network data to the node element 86 at 110 via the respective node device presence web service 85. The global device presence web service 20' receives the presence information from the node element 86 at 112. The global device presence web service 20' may then return the presence information to the cloud gateway 26' at 114, which may be passed back to the application server 16' or application 18.

By having access to both the route service 80 and relay database 82, the global device presence web service 20' is provided with the flexibility of having alternative sources of information to identify the infrastructure node 84 corresponding to the mobile device 12 associated with the presence information request. Similarly, the infrastructure nodes 84 having access to both local route services 88 and local relay databases 90, are provided with the flexibility of having alternative sources of information to identify the appropriate mobile device information sources, such as a wireless transport, for determining the appropriate network data.

Figure 10:
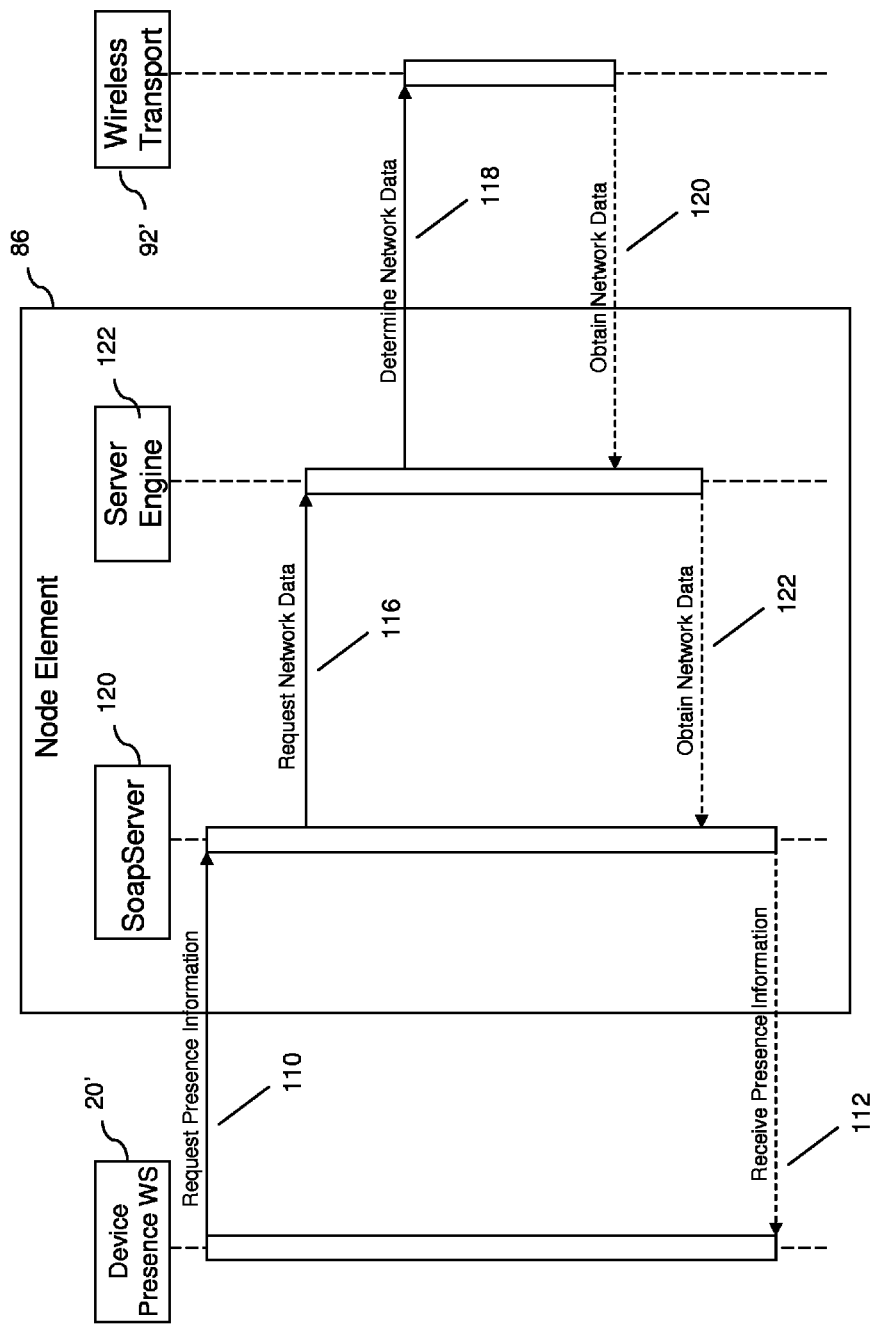
FIG. 10 is a sequence diagram illustrating operations performed in determining presence information using network data.

Referring now to FIG. 10, a sequence diagram is provided illustrating one way in which the node element 86 may handle the request provided by the global device presence web service 20' to the node device presence web service 85 at 110. The request sent at 110 may be translated by a SOAP server 120 in the node element 86 from a request for presence information to a request for network data at 116. The request for network data sent at 116 is then processed by a server engine 122. The server engine 120 determines the network data relevant to the presence information at 118 by mining the appropriate wireless transport 92'. The network data is obtained by the server engine 122 at 120, and then obtained by the SOAP server 120 at 122. At this point, the network data may be converted back into presence information. This presence information is then sent to the global device presence web service 20' at 112 as shown in FIG. 9.

It can be appreciated that various types of presence information can be mined from the network infrastructure 14 using the principles discussed herein.

For example, transport type and coverage status of a mobile device 12 can be identified. The mobile device transport type can, for example, be cellular or WiFi. The coverage status can, for example, be "in coverage," "out of coverage," or "having uncertain coverage." Transport type and coverage status can be mined from the wireless transport 92'. Using the methods described above, transport type and coverage status of a mobile device 12 can be identified by having the global device presence web service 20' select an appropriate node element 86, issue a "GetPinCoverage" SOAP request to the identified node element 86, and wait for a response. The SOAP request issued by the global device presence web service 20' may include the request entity, request ID and mobile device PIN as inputs. The node element 86 identifies the appropriate wireless transport 92' where the coverage status and transport type can be found, and extracts the relevant information. The response from the node element 86 may include a request/response header which include the request entity, request ID, mobile device PIN and result status code; the coverage state (in, our, or uncertain), a coverage timestamp indicating the time of last coverage state change) and a transport type (cellular or WiFi).

Roaming status of a mobile device 12 can also be identified. The mobile device 12 may be roaming, not roaming, or of an unknown roaming status. Roaming status can be mined from the local relay database 90 of the infrastructure node 84 being queried. Using the methods described above, roaming status of a mobile device 12 can be identified by having the global device presence web service 20' or node device presence web service 85 select an appropriate node element 86, issue a "GetPinRoaming" SOAP request to the identified node element 86, and wait for a response. The SOAP request issued by the global device presence web service 20' may include the request entity, request ID and mobile device PIN as inputs. The node element 86 queries, e.g., the local relay database 90 for the roaming status of the mobile device 12. The response from the node element 86 may include a request/response header which include the request entity, request ID, mobile device PIN and result status code; and the roaming status (roaming, not roaming, or unknown).

Figure 11:
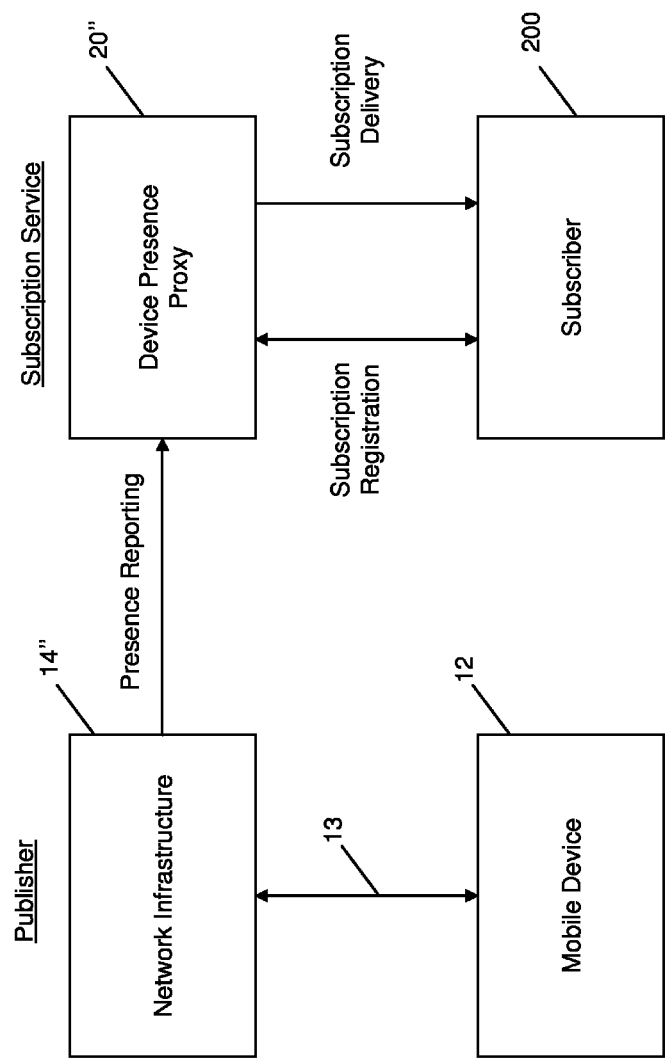
FIG. 11 is a schematic diagram of a communication system providing a subscription service for presence information.

Referring now to FIG. 11, a communication system 8" providing a subscription delivery model is shown. The network information mined or otherwise determined from, or provided by, one or more nodes in a network infrastructure 14" may be "published" by a subscription service to one or more subscribers 200. In the example shown in FIG. 11, a device presence proxy 20" provides the subscription service by enabling subscribers 200 to register for a subscription associated with presence information for one or more mobile devices 12. For example, an application running on an electronic device may subscribe to obtain presence information for each contact stored in an address book or contact list under certain criteria (e.g., when roaming, when not roaming, etc.). When the presence information associated with the subscription is available to the subscription service, the presence information is delivered to the subscriber 200 in accordance with the terms, rules, preferences, options, or criteria of the subscription. In this way, the subscriber 200 may be decoupled from the publisher (e.g., the network infrastructure 14") such that the presence information is delivered asynchronously and thus not requiring a poll or request to the device presence proxy 20" or other entity providing the subscription service in order to obtain such presence information.

It can be appreciated that the device presence proxy 20" shown in FIG. 11 may be the same entity as that shown in FIGS. 1 to 3 and described above, or may be a separate entity. In other words, the device presence proxy 20 may provide presence information according to both the request/response delivery model shown in FIGS. 1-10, or the subscription delivery model shown in FIG. 11; or subscription services may be provided by another entity. If separate device presence proxies 20 (or 20') and 20" are utilized, it can be appreciated that the device presence proxy 20" providing the subscription service may have the device presence API 22 and obtain data directly from the network infrastructure 14 similar to the device presence proxies 20 and 20' shown in FIGS. 1 to 3, and 8; or may be operable to communicate with the device presence proxy 20 (or 20') to obtain network data to be used in providing subscriptions. Accordingly, the configuration shown in FIG. 11 is for illustrative purposes only.

Figure 12:
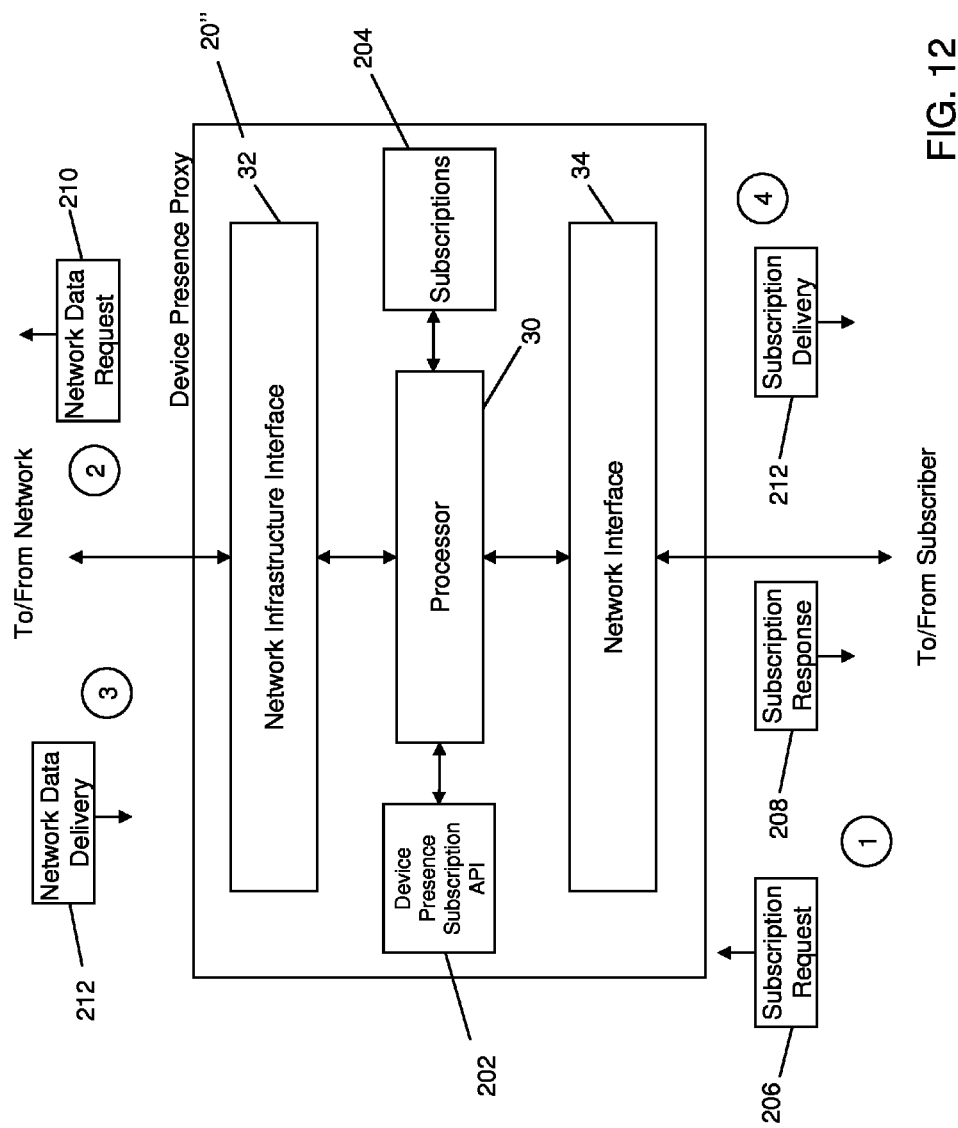
FIG. 12 is a block diagram of an example of a configuration for a device presence proxy providing the subscription service.

FIG. 12 illustrates an example of a configuration for the device presence proxy 20" shown in FIG. 11, where elements similar to those shown in FIG. 4 are given like numerals. In the example shown in FIG. 12, the device presence proxy 20" acts as a subscription service to enable subscribers 200 to register to obtain device presence information for one or more particular mobile devices 12, from the network infrastructure 14", without having to actively poll or request the data directly from the network infrastructure 14". In stage 1, the device presence proxy 20" receives a subscription request 206 from a subscriber 200 and returns a subscription response 208 to the subscriber 200, e.g., using a device presence subscription API 202. The subscription request 206 identifies one or more mobile devices 10 for which the subscriber 200 wishes to obtain device presence information, and may include one or more criteria under which the device presence information will be delivered to the subscriber 200. For example, the one or more criteria may specify under what condition(s) to deliver the device presence data (e.g., when roaming, when not roaming, etc.), how often to deliver the device presence information, etc.

It can be appreciated that the one or more criteria can relate to the status of the mobile devices 12 associated with the device presence information, which may include the subscriber 200 itself, when the subscriber 200 is associated with a mobile device 12. For example, the criteria may include what type of device presence data to deliver with respect to a set of contacts, as well as a criterion under which to trigger the deliver, such as when the subscriber 200 is not roaming.

The information associated with a particular subscription is stored in a subscriptions module or database (subscriptions 204), such that the subscriptions 204 may be referenced in order to deliver the device presence data to a particular subscriber 200, in accordance with a particular subscription 204.

A network data request 210 may be sent by the device presence proxy 20" in stage 2. The network data request 210 includes details of one or more subscriptions in order to identify to one or more nodes in the network infrastructure 14" what type of network data, and for what mobile device(s) 12, is/are required by the device presence proxy 20", in order to provide the registered subscription services. Alternatively, the device presence proxy 20" may send network data requests 210 periodically on behalf of the subscriber 200 in order to provide a subscription service. In either scenario, it can be appreciated that obtaining and delivering the network data to the subscriber 200 may be performed transparently to the subscriber 200 such that the subscriber 200 is not required to actively poll the network infrastructure 14" or the device presence proxy 20". Instead, the subscription service coordinates the obtaining and delivery of the device presence information on behalf of the subscriber 200 and thus acts as an "intermediary" between the subscriber 200 and the network infrastructure 14" (i.e. the "publisher").

Network data deliveries 212 may therefore occur in stage 3 at appropriate times (e.g., when the appropriate presence information becomes available), and once obtained by the device presence proxy 20", a subscription delivery 212 is completed in stage 4 using the network data delivered in stage 3.

FIGS. 13 and 14 illustrate example configurations for an application server 16" and mobile device 12" respectively, where similar elements to those shown in FIGS. 5 and 6 are given like numerals. The application server 16" and mobile device 12" each may include the device presence subscription API 202 to communicate with the device presence proxy 20" in order to register a subscription for obtaining device presence information associated with one or more mobile devices 12.

Figure 15:
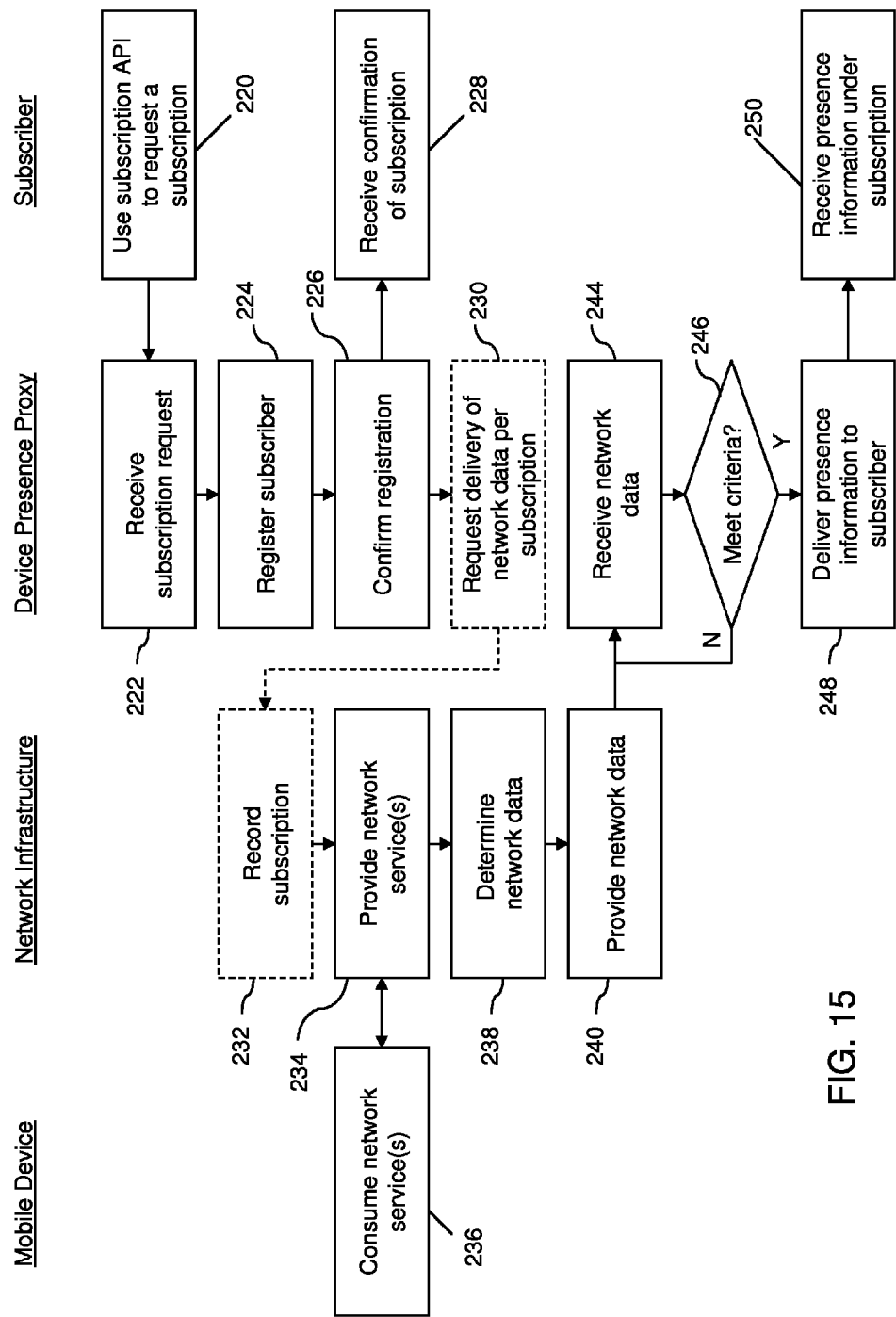
FIG. 15 is a flow chart illustrating an example of a set of computer executable operations that may be performed in providing device presence information according to a subscription.

FIG. 15 illustrates several operations that may be performed by various components in obtaining device presence information from exposed data from the network infrastructure 14 and delivering such data to a subscriber 200 according to a subscription. At 220 the subscriber 200 uses the device presence subscription API 202 to request registration of a subscription with the device presence proxy 20", which is acting as a subscription service. The device presence proxy 20" receives a subscription request 206 at 222, registers the subscriber 200 with a particular subscription at 224 (or creates a new subscription or service based on the request 206), and confirms the registration at 226, e.g., by sending a subscription response 208. The subscriber 200 receives the subscription response 208 at 228 which confirms the establishment of the subscription.

Once the subscription has been established, the device presence proxy 20" is responsible to obtain network data from the network infrastructure 14" and deliver device presence information in accordance with the subscription. This may be accomplished in various ways, depending on how the device presence proxy 20" obtains the network data from the network infrastructure 14". For example, the network infrastructure 14" may periodically provide all presence information available to it for all devices consuming network services 13 with one or more nodes in the network infrastructure 14". Alternatively, the network infrastructure 14" may store a list of mobile devices 12 associated with subscription services and report network data associated with any of the mobile devices 12 on the list when such data becomes available. In yet another alternative, the network infrastructure 14" may be mined when polled by the device presence proxy 20", e.g., periodically or according to criteria associated with particular subscriptions. As such, the device presence proxy 20" may optionally request delivery of network data according to a subscription at 230, which subscription is recorded by the network infrastructure 14" at 232.

The network infrastructure 14" provides network services 13 to a mobile device 12 at 234, e.g., messaging, telephony, web browsing, etc.; and the mobile device 12 consumes those network services 13 at 236. While consuming such network services 13, network data may be provided and/or recorded by the network infrastructure 14", e.g., as described above with respect to FIGS. 1-10. The network infrastructure 14" determines network data at 238 and provides the network data to the device presence proxy 20" at 240, e.g., according to a list of mobile devices 12 registered for subscriptions, and/or other criteria established by the device presence proxy 20".

The device presence proxy 20" receives the network data at 244 and determines if the received network data meets the criteria associated with the subscription registered at 224. If not, the device presence proxy 20" may continue to receive network data mined from the network infrastructure 14" at 244 until the criteria have been met. One the criteria for the subscription have been met, device presence data is delivered at 248 to the subscriber 200, which is received by the subscriber 200 at 250.

It can be appreciated from the example shown in FIG. 15 that network data relating to one or more mobile devices 12, which is obtained from the network infrastructure 14", can be delivered to subscribers 200 instead of having the device presence proxy 20" or network infrastructure 14" polled on demand.

Accordingly, there is provided a method comprising: receiving, via an application programming interface, a subscription request, the subscription request requesting a presence data for at least one mobile device; registering a subscription for a subscriber device according to the subscription request; obtaining network data from one or more network infrastructure nodes associated with providing service to the at least one mobile device; determining that at least a portion of the network data is associated with the subscription; and providing the at least a portion of the network data to the subscriber device via the application programming interface.

There is also provided a device presence proxy apparatus comprising a processor and a memory, the memory comprising computer executable instructions for: receiving, via an application programming interface, a subscription request, the subscription request requesting a presence data for at least one mobile device; registering a subscription for a subscriber device according to the subscription request; obtaining network data from one or more network infrastructure nodes associated with providing service to the at least one mobile device; determining that at least a portion of the network data is associated with the subscription; and providing the at least a portion of the network data to the subscriber device via the application programming interface.

There is also provided a computer readable medium comprising computer executable instructions for: receiving, via an application programming interface, a subscription request, the subscription request requesting a presence data for at least one mobile device; registering a subscription for a subscriber device according to the subscription request; obtaining network data from one or more network infrastructure nodes associated with providing service to the at least one mobile device; determining that at least a portion of the network data is associated with the subscription; and providing the at least a portion of the network data to the subscriber device via the application programming interface.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device presence proxy 20, application server 16, cloud platform 24, cloud gateway 26, or mobile device 12, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method for a subscription service comprising:
   registering a subscription for a subscriber device, the subscription comprising:
      an identifier of at least one mobile device for which the subscriber device wishes to periodically receive network-related device presence data; and
   pre-defined criteria specifying conditions for automatically delivering the network-related device presence data of the at least one mobile device to the subscriber device without the subscriber device having to actively poll for the network-related device presence data;
   identifying, via the device presence proxy, one or more network infrastructure nodes providing service to the at least one mobile device;
   obtaining network data from the identified network infrastructure nodes for the at least one mobile device, the network data associated with the network service provided to the at least one mobile device, and wherein obtaining the network data includes comprises communicating with a first network infrastructure node to identify a second network infrastructure node that is capable of providing network the network-related device presence data;
   determining that at least a portion of the network data is associated with the subscription and that the at least a portion of the network data satisfies the pre-defined criteria associated with the subscription registered; and
   providing the network data to the subscriber device according to the subscription, upon the determination via an application programming interface associated with the device presence proxy to a second application programming interface associated with the subscriber device.

2. The method of claim 1, further comprising:
   selectively providing the application programming interface to a server or an application, or both the server and the application.

3. The method of claim 2, wherein the subscription is associated with the application loaded on the mobile device.

4. The method of claim 1, wherein the network data comprises network-related device presence data periodically mined from the identified network infrastructure nodes and is selected from a group consisting of:
   coverage status,
   roaming status,
   transport type,
   date of a previous transport change,
   time of a previous transport change,
   last authentication result for the mobile device, and
   last time of authentication.

5. The method of claim 1, wherein the network data is obtained from a plurality of network infrastructure nodes.

6. The method of claim 1, wherein the application programming interface is associated with a cloud application development platform.

7. The method of claim 1, wherein the identifier is used to determine one or more network infrastructure nodes from which to obtain network the network-related device presence data.

8. The method of claim 1, wherein the obtaining comprises:
   communicating a network inquiry to one or more network infrastructure nodes; and receiving one or more network responses from the one or more network infrastructure nodes, the one or more network responses including the network data.

9. The method of claim 1, wherein the subscription requests the network-related device presence data for a plurality of mobile devices, and the subscription service provides a network-related device presence status for each of the plurality of mobile devices.

10. A device presence proxy apparatus comprising a processor and a memory, the memory comprising computer executable instructions for performing a subscription service by:
    registering a subscription for a subscriber device, the subscription comprising:
       an identifier of at least one mobile device for which the subscriber device wishes to periodically receive network-related device presence data; and
    pre-defined criteria specifying conditions for automatically delivering the network-related device presence data of the at least one mobile device to the subscriber device without the subscriber device having to actively poll for the network-related device presence data;
    identifying, via the device presence proxy apparatus, one or more network infrastructure nodes providing network service to the at least one mobile device;
    obtaining network data from the identified network infrastructure nodes for the at least one mobile device, the network data associated with the network service provided to the at least one mobile device, and wherein obtaining the network data includes comprises communicating with a first network infrastructure node to identify a second network infrastructure node that is capable of providing network the network-related device presence data;
    determining that at least a portion of the network data is associated with the subscription and that the at least a portion of the network data satisfies the pre-defined criteria associated with the subscription registered; and providing the network data to the subscriber device according to the subscription, upon the determination via the an application programming interface associated with the device presence proxy to a second application programming interface associated with the subscriber device.

11. The device presence proxy apparatus of claim 10, further comprising instructions for:

selectively providing the application programming interface to a server or an application, or both the server and the application.

12. The device presence proxy apparatus of claim 11, wherein the subscription is associated with the application loaded on the at least one mobile device.

13. The device presence proxy apparatus of claim 10, wherein the presence network data comprises network-related device presence data periodically mined from the identified network infrastructure nodes and is selected from a group consisting of:

coverage status,
roaming status,
transport type,
date of a previous transport change,
time of a previous transport change,
last authentication result for the mobile device, and
last time of authentication.

14. The device presence proxy apparatus of claim 10, wherein the network data is obtained from a plurality of network infrastructure nodes.

15. The device presence proxy apparatus of claim 10, wherein the application programming interface is associated with a cloud application development platform.

16. The device presence proxy apparatus of claim 10, wherein the identifier is used to determine one or more network infrastructure nodes from which to obtain the network data.

17. The device presence proxy apparatus of claim 10, wherein the obtaining comprises:

communicating a network inquiry to one or more network infrastructure nodes; and receiving one or more network responses from the one or more network infrastructure nodes, the one or more network responses including the network data.

18. The device presence proxy apparatus of claim 10, wherein the subscription requests network-related device presence data for a plurality of mobile devices, and the subscription service provides a network-related device presence status for each of the plurality of mobile devices.

19. A non-transitory computer readable medium comprising computer program instructions for a subscription service embodied therewith, the computer program instructions executable by a device to cause the device to:

registering a subscription for a subscriber device, the subscription comprising:

an identifier of at least one mobile device for which the subscriber device wishes to periodically receive network-related device presence data; and pre-defined criteria specifying conditions for automatically delivering the network-related device presence data of the at least one mobile device to the subscriber device without the subscriber device having to actively poll for the network-related device presence data;

identifying, via the device presence proxy, one or more network infrastructure nodes providing network service to the at least one mobile device;

obtaining network data from the identified network infrastructure nodes for the at least one mobile device, the network data associated with the network service provided to the at least one mobile device, and wherein obtaining the network data includes comprises communicating with a first network infrastructure node to identify a second network infrastructure node that is capable of providing network the network-related device presence data;

determining that at least a portion of the network data is associated with the subscription and that the at least a portion of the network data satisfies the pre-defined criteria associated with the subscription registered; and providing the network data to the subscriber device according to the subscription upon the determination via the an application programming interface to a second application programming interface associated with the subscriber device.

20. The computer readable medium of claim 19, further comprising instructions for:

selectively providing the application programming interface to a server or an application, or both the server and the application.

21. The computer readable medium of claim 20, wherein the subscription is associated with the application loaded on the mobile device.

22. The computer readable medium of claim 19, wherein the network data more comprises network-related device presence data periodically mined from the identified network infrastructure nodes and is selected from a group consisting of:

coverage status,
roaming status,
transport type,
date of a previous transport change,
time of a previous transport change,
last authentication result for the mobile device, and
last time of authentication.

23. The computer readable medium of claim 19, wherein the network data is obtained from a plurality of network infrastructure nodes.

24. The computer readable medium of claim 19, wherein the application programming interface is associated with a cloud application development platform.

25. The computer readable medium of claim 19, wherein the identifier is used to determine one or more network infrastructure nodes from which to obtain the network-related device presence data.

26. The computer readable medium of claim 19, wherein the obtaining comprises:

communicating a network inquiry to one or more network infrastructure nodes; and receiving one or more network responses from the one or more network infrastructure nodes, the one or more network responses including the network data.

27. The computer readable medium of claim 19, wherein the subscription requests the network-related device presence data for a plurality of mobile devices, and the subscription service provides a network-related device presence status for each of the plurality of mobile devices.

* * * * *